(12) United States Patent
Menke et al.

(10) Patent No.: US 9,199,797 B2
(45) Date of Patent: Dec. 1, 2015

(54) ASSEMBLY OF A MODULE AND A MOUNTING FRAME FOR A MODULAR CONVEYOR, MODULE AND MOUNTING FRAME CONFIGURED FOR USE IN SUCH AN ASSEMBLY AND CONVEYOR COMPRISING SUCH AN ASSEMBLY

(71) Applicants: Cornelis Hendrik Mijndert Menke, 's-Gravenzande (NL); Remco van der Ende, 's-Gravenzande (NL)

(72) Inventors: Cornelis Hendrik Mijndert Menke, 's-Gravenzande (NL); Remco van der Ende, 's-Gravenzande (NL)

(73) Assignee: REXNORD FLATTOP EUROPE B.V., 'S-Gravenzande (NL)

( * ) Notice: Subject to any disclaimer, the term of this patent is extended or adjusted under 35 U.S.C. 154(b) by 0 days.

(21) Appl. No.: 14/382,989

(22) PCT Filed: Mar. 6, 2013

(86) PCT No.: PCT/NL2013/050146
§ 371 (c)(1),
(2) Date: Sep. 4, 2014

(87) PCT Pub. No.: WO2013/137719
PCT Pub. Date: Sep. 19, 2013

(65) Prior Publication Data
US 2015/0183585 A1    Jul. 2, 2015

(30) Foreign Application Priority Data

Mar. 7, 2012 (NL) ........................................ 2008431
Oct. 1, 2012 (NL) ........................................ 2009542

(51) Int. Cl.
*B65G 17/24*    (2006.01)
*B65G 17/08*    (2006.01)
(Continued)

(52) U.S. Cl.
CPC ............... *B65G 17/24* (2013.01); *B65G 17/08* (2013.01); *B65G 47/268* (2013.01); *B65G 2207/30* (2013.01)

(58) Field of Classification Search
None
See application file for complete search history.

(56) References Cited

U.S. PATENT DOCUMENTS 4,832,183 A * 5/1989 Lapeyre ................. B65G 17/08
198/690.2
6,321,904 B1 * 11/2001 Mitchell ................... 198/867.11
(Continued)

FOREIGN PATENT DOCUMENTS

EP    1 614 644 A1    1/2006
EP    2 105 391 A1    9/2009
(Continued)

OTHER PUBLICATIONS

International Search Report as mailed on Jul. 1, 2013 for International Application No. PCT/NL2013/050146.

*Primary Examiner* — Kavel Singh
(74) *Attorney, Agent, or Firm* — Quarles & Brady LLP

(57) ABSTRACT

The invention relates to a module for a modular conveyor, comprising a body part extending transversely to a direction, having a substantially closed, flat top surface and a bottom. On the top surface, a receiving provision is provided for coupling a mounting frame. The receiving provision is provided with one or more stop elements projecting relative to the top surface, with each stop element provided with a flange. The mounting frame is provided with one or more wings, with each wing configured to engage under a respective flange upon placement of the mounting frame on the receiving provision. The receiving provision and the mounting frame are configured for placement of the mounting frame on the module and removal from the module, respectively, in an insertion direction which is directed substantially transversely to the directions.

19 Claims, 6 Drawing Sheets

(51) Int. Cl.
*B65G 17/00* (2006.01)
*B65G 47/26* (2006.01)

(56) References Cited

U.S. PATENT DOCUMENTS

| | | |
|---|---|---|
| 6,467,610 B1 | 10/2002 | MacLachlan |
| 6,578,704 B1 | 6/2003 | MacLachlan |
| 6,857,516 B1 * | 2/2005 | Verdigets .............. B65G 17/40 198/844.1 |
| 2004/0238329 A1 | 12/2004 | Verdigets et al. |
| 2006/0076218 A1 * | 4/2006 | Marshall ............... B65G 17/08 198/853 |

FOREIGN PATENT DOCUMENTS

| | | | |
|---|---|---|---|
| GB | 2 137 918 A | 10/1984 | |
| NL | 1 010 530 C2 | 5/2000 | |
| WO | WO 0132533 A2 * | 5/2001 | ............. B65G 17/24 |

\* cited by examiner

ASSEMBLY OF A MODULE AND A MOUNTING FRAME FOR A MODULAR CONVEYOR, MODULE AND MOUNTING FRAME CONFIGURED FOR USE IN SUCH AN ASSEMBLY AND CONVEYOR COMPRISING SUCH AN ASSEMBLY

CROSS-REFERENCE TO RELATED APPLICATIONS

This application represents the national stage entry of PCT International Application No. PCT/NL2013/050146 filed Mar. 6, 2013 and claims the benefit of Dutch Application No. NL 2008431 filed Mar. 7, 2012 and Dutch Application No. NL 2009542 filed Oct. 1, 2012. The contents of both of these applications are hereby incorporated by reference as if set forth in their entirety herein.

BACKGROUND OF THE INVENTION

The invention relates to an assembly of a module and a mounting frame for a modular conveyor, wherein the module comprises a body part extending transversely to a direction, having a substantially closed flat top surface and a bottom, wherein the body part at the front and rear, viewed in the direction, is provided with coupling elements and wherein the coupling elements of the module are couplable to coupling elements of similar modules successive in the direction, and wherein a receiving provision is provided for coupling the mounting frame, wherein the receiving provision comprises a quick coupling.

Such a module for conveying systems is described in, for instance, U.S. Pat. No. 6,578,704 for providing holders with rollers on a conveying surface. With the known module, an attribute to be placed on the module, for instance a holder with roller, is inserted from above into a hole in the module. To this end, the attribute comprises a projection which engages through the hole and is provided with a transverse connecting projection which, after insertion into the hole, comes to abut against the bottom of the module. The connection must be strong because during use, high torsional and shear forces arise on the attribute which need to be transmitted to the module without the attribute breaking off or coming loose. To this end, especially the connecting projection should have a strength and thickness such that such breaking off is prevented, as a consequence of which, however, this connecting projection projects from the bottom of the module over such a distance that in some uses, this forms an impediment to the further parts provided under the conveying system, such as a drive of the conveying system. As a result, the known module is not applicable for multiple conveying systems. Furthermore, removing the mounting frame from and placing it on the module is laborious and time consuming, since mounting frames of adjacent modules may be in the way.

OBJECTIVES OF THE INVENTION

Accordingly, there exists a need to provide an assembly of module and mounting frame that can be widely applicable and that enables simple removal of a mounting frame from, and placement thereof on, a module. The present invention contemplates the provision of a module of the type mentioned in the opening paragraph hereof, with which, while maintaining the advantages, the drawbacks mentioned can be obviated.

SUMMARY OF THE INVENTION

For realizing at least one of the objectives, the invention provides an assembly of a module and a mounting frame for a modular conveyor, wherein the module comprises a body part extending transversely to a direction, having a substantially closed flat top surface and a bottom, wherein the body part at the front and rear, viewed in the direction, is provided with coupling elements and wherein the coupling elements of the module are couplable to coupling elements of similar modules successive in the direction, and wherein a receiving provision is provided for coupling the mounting frame, wherein the receiving provision comprises a quick coupling, characterized in that the receiving provision and the mounting frame are configured for placement of the mounting frame on the module and removal from the module, respectively, in an insertion direction which is directed substantially transverse to the direction. As the insertion direction is directed transversely to the direction, in other words, from the side of the module, it can be provided that a mounting frame can be removed from and placed on the module in an easily accessible manner without other mounting frames of adjacent modules of a conveyor being in the way. Further, this also improves the safety of operators who are to perform the removal and placement of the mounting frames.

In one embodiment of an assembly according to the invention, the receiving provision is provided with one or more stop elements projecting relative to the top surface, with each stop element provided with a flange, and the mounting frame is provided with one or more wings, with each wing configured to engage under a respective flange upon placement of the mounting frame on the receiving provision. By providing the module with a stop element with flanges, and providing the mounting frame with wings which engage below the flanges, a quick coupling can be furnished which projects solely above the top surface, so that the module is not a hindrance to constructions at the underside of the conveying system and therefore has versatile applicability. Also, the flanges serve as a lock against the mounting frame coming loose and/or tilting from the module. Furthermore, as the stop elements project relative to the top surface of the module, forces that act on the mounting frame can be well absorbed and transmitted to the module. Thus, a good transmission of forces can be provided, without the design of the module becoming complex, or concessions needing to be made with regard to the tensile strength of the module.

An extremely simple construction of the assembly of the module and mounting frame according to one embodiment of the invention is feasible here if the wings of the mounting frame are in one plane with the underside of the mounting frame.

In a further embodiment of an assembly according to the invention, the assembly is provided with at least one lock, which is configured for locking the mounting frame against uncoupling from the module. What can be prevented by locking the mounting frame with a lock, is that the mounting frame inadvertently comes loose. Such a lock can prevent the mounting frame from sliding and/or turning over the top side of the module under the influence of shear and/or rotational and/or torsional forces.

A particularly advantageous embodiment of such a lock is provided in that the module is provided with at least one projection on the top surface of the module, while the mounting frame is provided with at least one recess and wherein the at least one projection is configured such that upon placement of the mounting frame, it coincides with a respective recess of the mounting frame. When the projection is flexible and/or resilient, the projection has freedom/clearance to bend away when the mounting frame is slid over the projection. Here, a run-on surface of the projection can provide for a reproducible guidance into the recess.

In an alternative preferred embodiment, the module is provided with a locking clip, while the mounting frame is provided with a recess and the clip is receivable in and can be clipped into the above-mentioned recess of the mounting frame. Such a clip can provide that a mounting frame can be removed from and placed on a module, respectively, in an easily accessible manner without other mounting frames from adjacent modules being in the way. A stable locking can be obtained in an embodiment of an assembly according to the invention in which the clip is provided with a lip that can be spring-biased, while, preferably, the top surface of the module is provided with an opening for receiving the lip.

In a further advantageous embodiment of an assembly according to the invention, the stop element is a U-shaped stop element, with the one or more flanges provided along the legs of the U-shape. As a result, it is possible to slide the mounting frame quickly and correctly from the side into the open end of the U-shape under the flanges.

In a further embodiment of an assembly according to the invention, the stop element comprises a round top piece provided centrally on the top surface of the module, which is provided, all around at an intermediate distance from the top surface, with a flange which is provided with at least one, preferably two, recesses, and wherein the mounting frame is provided with a hole with at least one, preferably two, wings, which are each configured to fit, upon placement of the mounting frame over the top piece, through a respective recess and, by turning of the mounting frame, to engage under a respective flange. In this manner, the quick coupling is configured as a kind of bayonet catch, so that a rapid and proper detachable connection of the mounting frame, after it has been inserted from the side onto the module, can be realized. As an extra lock against rotation of the mounting frame, and in order to thus prevent the inadvertent uncoupling of the quick coupling, the module is provided with claws, while the mounting frame is provided with slots for receiving the claws.

The receiving provision can be provided relatively simply on the top side of the module, for instance, the receiving provision, in particular the quick coupling and/or the stop elements, may be injection molded, preferably injection molded integrally with the module.

As a result of the receiving provision being provided on the top side of the module, the starting point for the construction of the module can be already-existing standard modules, without this requiring that the force-transmitting elements of the hinge parts and body parts of the modules be reconstructed.

In a particularly advantageous embodiment of an assembly according to the invention, the stop elements are provided with reinforcing ribs. As a result, in use, the stop elements can absorb and transmit high torsional and shear forces to the module without the stop elements breaking off or coming loose.

In a particularly advantageous embodiment of an assembly according to the invention, the receiving provision is configured such that the mounting frame is couplable to the module in a tool-free manner. What can thus be achieved is that a mounting frame can be relatively rapidly coupled to a module, without the production line in the factory needing to be stopped for long, so that costs can be saved. Also, it is not necessary anymore to look for suitable tools, so that a mounting frame can be coupled relatively rapidly at any random time. Furthermore, the receiving provision may be configured such that the mounting frame can be uncoupled from the module in a tool-free manner.

In a further embodiment of an assembly according to the invention an axle is mounted on the mounting frame, while the axle is provided with at least one roller. This embodiment, in which preferably one roller is mounted centrally above the module on the axle and optionally guiding rollers are mounted at the terminal ends of the axle, is suitable in particular for use in conveyors for conveying heavier objects, such as vehicles, with the rollers providing guidance in, for example, a channel or track which is placed next to the conveyor.

The invention also relates to a module configured for use in an assembly according to the invention, while preferred embodiments of the modules can include the above-described features.

The invention also relates to a mounting frame configured for use in an assembly according to the invention, while preferred embodiments of the mounting frame can include the above-described features.

Finally, the invention relates to a conveyor comprising at least one assembly according to the invention, wherein the direction is the conveying direction of the conveyor. The conveyor can then be wholly assembled from modules with quick coupling according to the invention, but can also comprise a mix of modules with quick couplings and other modules, in particular similar modules without quick coupling. Here, the conveyor can be configured as a chain, with the conveyor being only one module wide transversely to the conveying direction. The conveyor can also be configured as a conveying mat, with several modules located next to each other transversely to the conveying direction. By including modules with a receiving provision for a mounting frame in the modular conveyor, there is provided, as it were, a quick coupling. What can thus be obviated is that the conveyor has to be broken if a user wishes to have a mounting frame of a particular module at the location of another module in the conveyor, or if a mounting fame has to be replaced with another mounting frame.

A particularly advantageous conveyor according to the invention is provided with several assemblies according to the invention, with the distance between at least two adjacent ones of the assemblies being different from the distance between other adjacent assemblies. This configuration is based on the insight that the instability of conveyors observed in practice, especially for conveying heavier objects, such as vehicles, is caused by equal distances between all mounting frames of the conveyor. These equal intervals cause the conveyor in use to enter a state of natural vibration, which can entail unwanted issues. By equipping the conveyor according to this design with assemblies that are placed at different intervals, i.e., different intermediate distances, it appears that the natural vibrations of the conveyor during use can be considerably reduced.

BRIEF DESCRIPTION OF THE DRAWINGS

The invention will be further elucidated on the basis of non-limiting exemplary embodiments, which are represented in the drawings. In the drawings.

DETAILED DESCRIPTION OF EXEMPLARY EMBODIMENTS

Figure 1A:
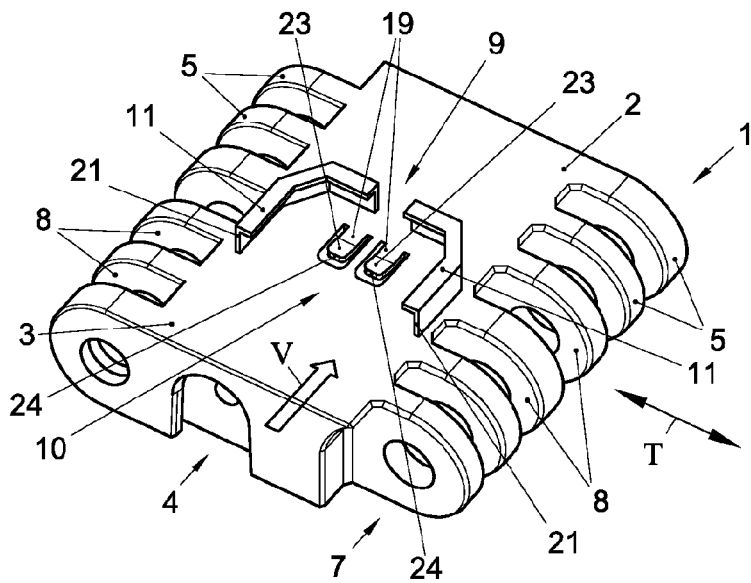
FIG. 1A shows a perspective view of a module according to a first embodiment of the invention.

It is noted that the Figures are only schematic representations of preferred embodiments of the invention. In the Figures, like or corresponding parts are denoted with the same reference numerals.

FIG. 1A shows a perspective view of a first embodiment of a module 1 according to the invention for a modular conveyor, comprising a body part 2 extending transversely to a conveying direction T, having a substantially closed, flat top surface 3 and a bottom 4, the body part 2 comprising coupling elements 5 at the front and rear as viewed in the conveying direction T. The coupling elements 5 comprise on both front and rear side a series of hinge parts 7 and receiving spaces 8 which are alternately successive transversely to the conveying direction, so that hinge parts 7 and receiving spaces 8 can interdigitate with receiving spaces 8 and hinge parts 7 of similar modules successive in conveying direction, and the successive modules are hingedly couplable by means of hinge pins which reach through hinge bores provided in the hinge parts and extend transversely to the conveying direction T. Further, a receiving provision 9 is provided for coupling a mounting frame 12, with the receiving provision 9 comprising a quick coupling 10.

Figure 1B:
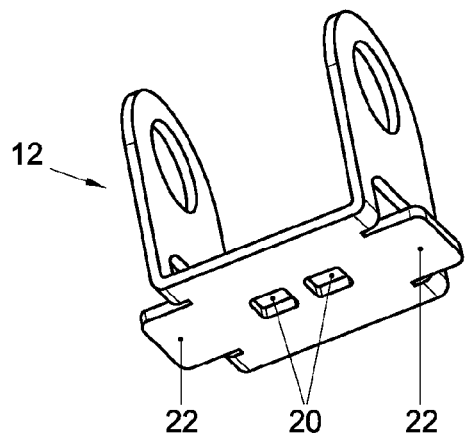
FIG. 1B shows a perspective view of a part of a mounting frame according to the first embodiment of the invention.
Figure 1C:
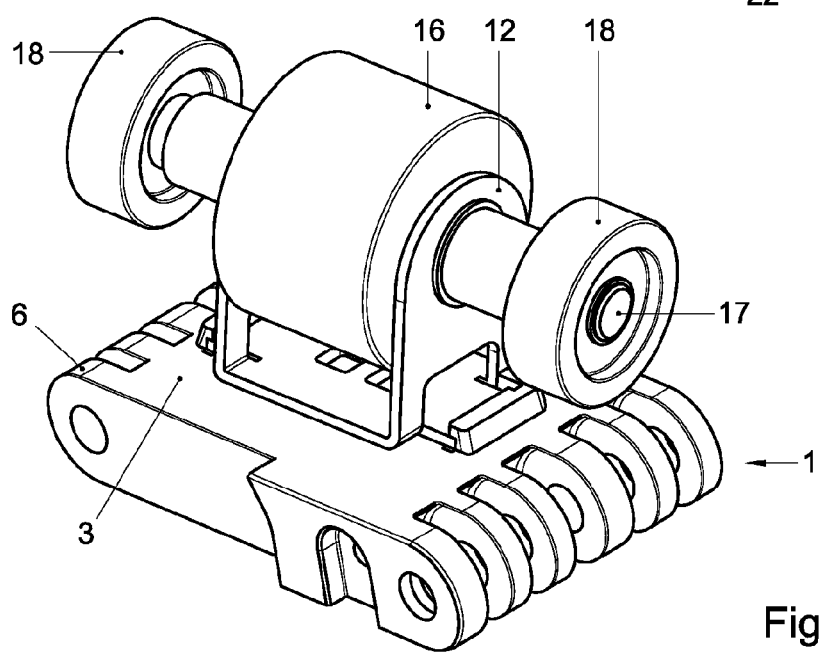
FIG. 1C shows a perspective view of an assembly according to the first embodiment of the invention with the module according to FIG. 1A and the mounting frame according to FIG. 1B, with the mounting frame bearing rollers.

Here, the quick coupling 10 comprises two C-shaped stop elements 11 projecting relative to the top surface 3 and provided with flanges 21. The stop elements 11 provide that shear forces or torsional forces acting on the mounting frame 12 can be transmitted to and absorbed by the module 1. Owing to the stop elements 11, the quick coupling can be of lighter design. The stop elements 11 preferably project above the substantially flat top surface 3, so that the stop elements 11 upstanding on the top surface 3 transmit the forces that act on the mounting frame 12 to the module 1. FIG. 1B shows that the mounting frame 12 is provided with wings 22, which are configured to engage under the flanges 21 upon placement of the mounting frame 12 on the module 1 according to the insertion direction V. The flanges 21 serve as a lock against the mounting frame 12 coming loose or tilting from the module 1. Preferably, the wings 22 of the mounting frame 12 are in one plane with the underside of the mounting frame 12 which cooperates with the top surface 3 of the module. As a result, the mounting frame 12 rests against the substantially flat top surface 3 and at the same time against the stop elements 11, so that a proper transmission of forces can be realized.

Optionally, the module 1 may be provided with a lock which comprises at least one projection 19. The projection 19 or several projections 19 are configured such that upon placement of a mounting frame 12, they coincide with recesses 20 in the mounting frame 12. The projections 19 can for instance snap into and/or hook into the recess 20 in that they have freedom/clearance to bend away when sliding over the projections 19 of the mounting frame 12. Also, the projections 19 can be configured to be flexible and/or resilient. Basically, the projections 19 project above the top surface 3.

In the embodiment shown in FIG. 1A, the projections have a run-on surface 23 which rises in the direction of coupling of the mounting frame 12. After the projections 19 are snapped into the recesses 20 of the mounting frame 12, the mounting frame 12 is restrained from being uncoupled in opposite direction by an upstanding flat side 24 of the projection 19. For uncoupling the mounting frame in a simple manner, the projections 19 can be configured such that by depression of the projections 19, they allow uncoupling of the mounting frame 12. For instance, through depression, the projections 19 may be partly recessed into the body part 2 of the module 1.

Figure 2A:
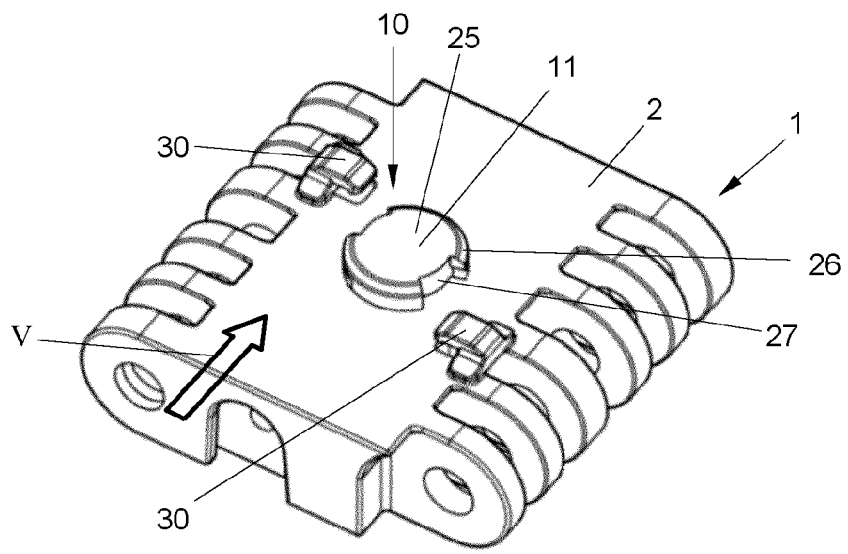
FIG. 2A shows a perspective view of a module according to a second embodiment of the invention.
Figure 2B:
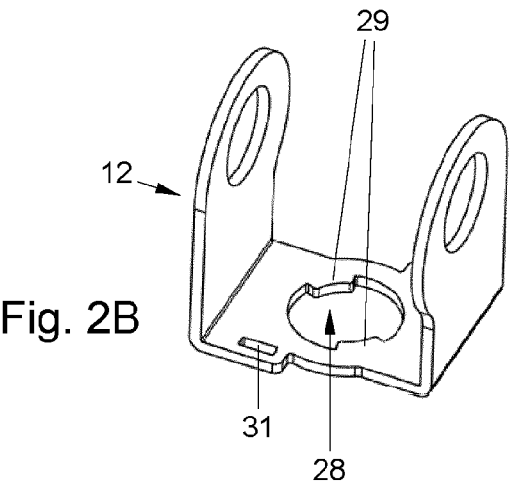
FIG. 2B shows a perspective view of a part of a mounting frame according to the second embodiment of the invention.
Figure 2C:
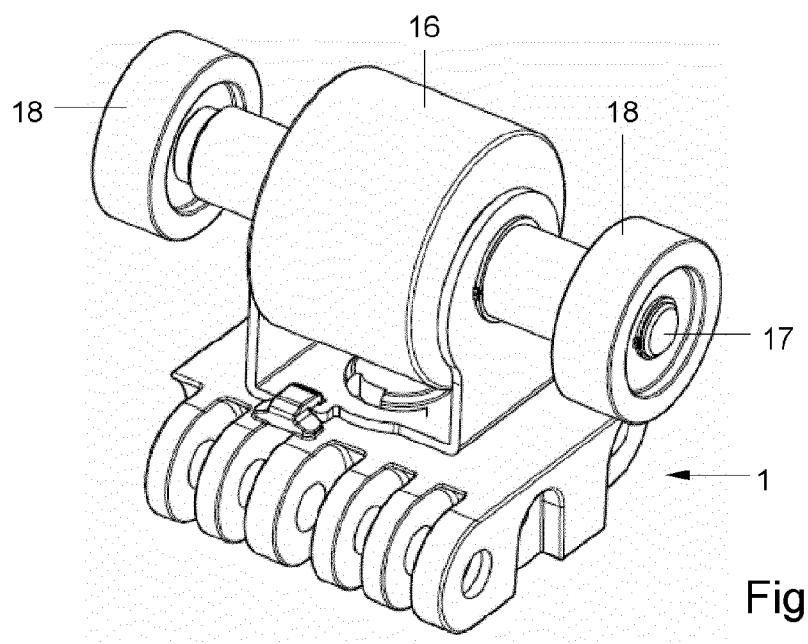
FIG. 2C shows a perspective view of an assembly according to the second embodiment of the invention with the module according to FIG. 2A and the mounting frame according to FIG. 2B, with the mounting frame bearing rollers.

FIGS. 2A-C show a second embodiment of the invention, in which the quick coupling 10 is designed as a bayonet. To that end, a top piece 25 is provided on the top surface 3 of the body part 2 of the module 1, which is provided with a flange 26 all around, at an intermediate distance from the top surface 3. The flange 26 is further provided with at least one, but preferably at least two, recesses 27. The mounting frame 12 has a hole 28 which, after the mounting frame 12 is slid via the insertion direction V over the top piece, upon downward movement fits around the top piece 25, and the mounting frame 12 adjacent the hole has at least one wing 29, which, during placement of the mounting frame 12 over the top piece 25, fit through the recesses 27, and, by turning of the mounting frame 12, are placed under the flange, for rapid tool-free coupling of the mounting frame 12 to the module 1. The flanges 26 serve as lock against removal of the mounting frame 12 from the module 1 in a direction away from the top surface 3. The top piece 25 also serves as stop element 11 for absorbing at least shear forces of the mounting frame 12.

As additional lock against rotation of the mounting frame 12 and to thus counteract the inadvertent uncoupling of the quick coupling 10, claws 30 can be provided on the module 1, which, by means of a snap connection or through hooking, engage in slots 31 of the mounting frame 12, as depicted in FIG. 2B. Alternatively, for instance, an embodiment not shown can be used, whereby an opening is provided in the module 1 which, after coupling of the mounting frame 12, coincides with for instance an eye or hole in the mounting frame 12, through which a locking pin can then be inserted. Optionally, the locking pin, in turn, may be locked with, for instance, a locking ring.

Figure 3A:
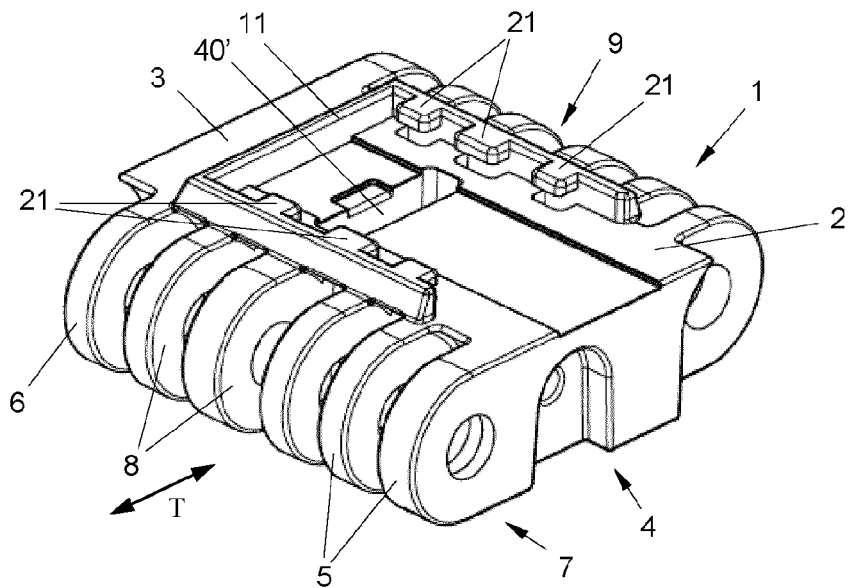
FIG. 3A shows a perspective view of a module according to a third embodiment of the invention.
Figure 3B:
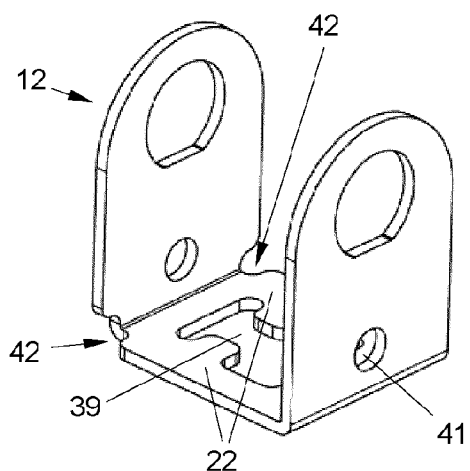
FIG. 3B shows a perspective view of a part of a mounting frame according to the third embodiment of the invention.

In FIGS. 3A-3E, a third embodiment according to the invention is shown, in which the module 1 has a receiving provision 9 in the form of a U-shaped stop element 11, against which the mounting frame 12 can be placed and in which it can be received. Just as in the embodiment of FIGS. 2A-C, in this embodiment, one or more flanges 21 are provided on the stop elements 11 along the legs of the U-shape of the stop elements 11. Here, the legs of the U-shape, and the open end of the U-shape, respectively, are directed substantially transversely to the conveying direction T. As a result, it can not only be provided that forces acting substantially in the same direction as the conveying direction T on a mounting frame 12 mounted on the module 1 can be transmitted better via the mounting frame 12 to the U-shaped stop element 11 of the receiving provision 9 to the module 1 of a conveyor, but also the mounting frame 12 can be slid on the module 1 or be removed therefrom, respectively, via an insertion direction V that is substantially directed transversely to the direction T. FIG. 3B shows that the mounting frame 12 is provided with wings 22, which are configured to engage under the flanges 21 upon placement of the mounting frame 12 on the module 1. The wings 22 of the mounting frame are formed by a recess 42 in the mounting frame. This recess 42 not only provides that upon placement of the mounting frame 12 on the module 1 the wings 22 can engage under the flanges 21 of the stop element 11, but also that the remaining portion of the mounting frame 12 upon placement on the module 1 can easily pass over the U-shaped stop element 11.

The flanges 21 serve as lock against upward coming loose and/or tilting of the mounting frame 12 from the module 1 Preferably, the wings 22 of the mounting frame 12 are in one plane with the underside of the mounting frame 12, which cooperates with the top surface 3 of the module.

Figure 3C:
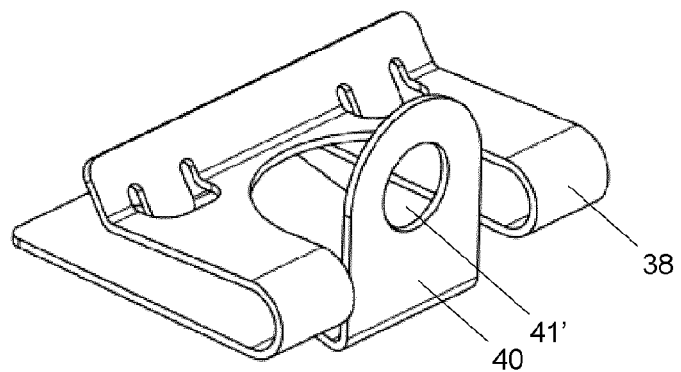
FIG. 3C shows a perspective view of a clip for locking the mounting frame according to FIG. 3B.
Figure 3D:
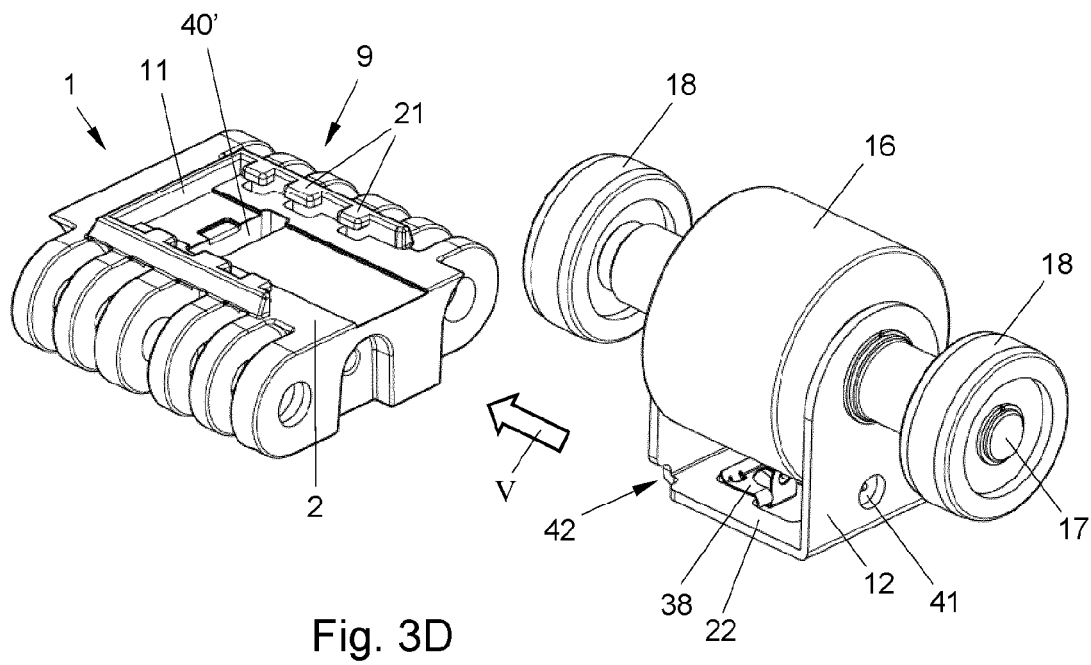
FIG. 3D shows a perspective view of the insertion of the mounting frame according to FIG. 3B with clip into the module according to FIG. 3A, with the mounting frame bearing rollers.
Figure 3E:
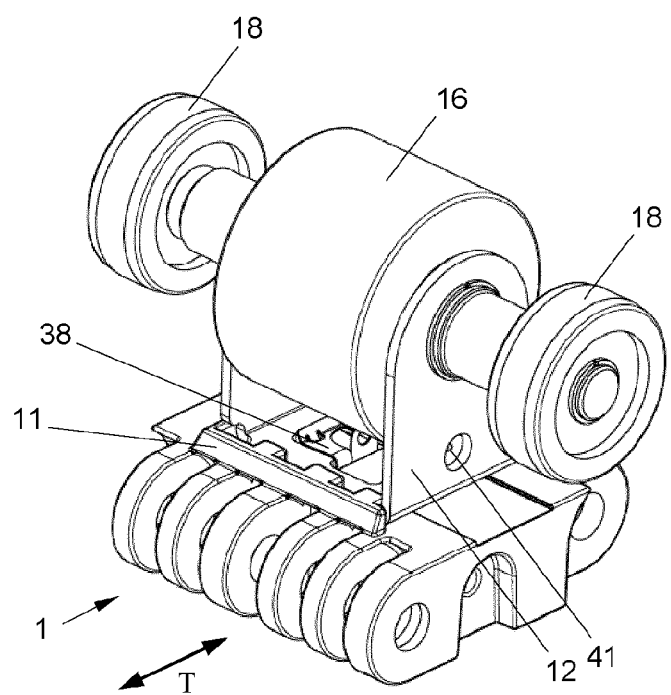
FIG. 3E shows a perspective view of an assembly according to the third embodiment of the invention in coupled condition.

Optionally, the module 1 can be provided with a lock such as a clip 38. This is shown in FIG. 3C. The clip 38 can have a U-shape, die-cut from a steel sheet, which can be received in a recess 39 in the mounting frame 12 and be clipped onto the mounting frame 12. Together with the mounting frame 12, the clip 38 is placed on the module 1 in an insertion direction V. The insertion direction V is here directed substantially transversely to the conveying direction T of the conveyor in which the module 1 is included. As a result, it can be provided that the mounting frame 12 located or not located on the module 1 can be removed from/placed on the module 1 in an easily accessible manner without other mounting frames 12 of adjacent modules 1 of a conveyor being in the way. Upon placement of the mounting frame 12 with the clip 38 on the module 1, a lip 40 of the clip 38 is spring-biased. When the mounting frame 12 with clip 38 is placed in the desired location on the module 1, the biased lip 40 of a clip 38 preferably falls in a recess or opening 40' in the top surface 3 of the module 1, see FIGS. 3A and 3D, and thus prevents the mounting frame 12 being removed against the insertion direction V.

For removing the mounting frame 12 from the module, the lip 40 of the clip 38 must be pressed upwards again, for instance by means of a screwdriver or finger or the like, so that the mounting frame 12 with clip 38 can be removed from the module 1. For instance a recess, such as for example a hole 41, may be provided in the mounting frame 12 for inserting a screw driver therethrough. The screwdriver then engages in a corresponding hole 41' of the clip 38, for pressing the lip 40 upwards. The mounting frame 12 can then be elegantly used as lever support for the screwdriver.

In an alternative embodiment, not shown, no recess needs to be provided in the top surface 3 of the module 1, but the mounting frame 12 is retained by means of the clamped fit generated by the spring bias of the lip 40 of the clip 38 between mounting frame/clip and module 1.

Figure 4A:
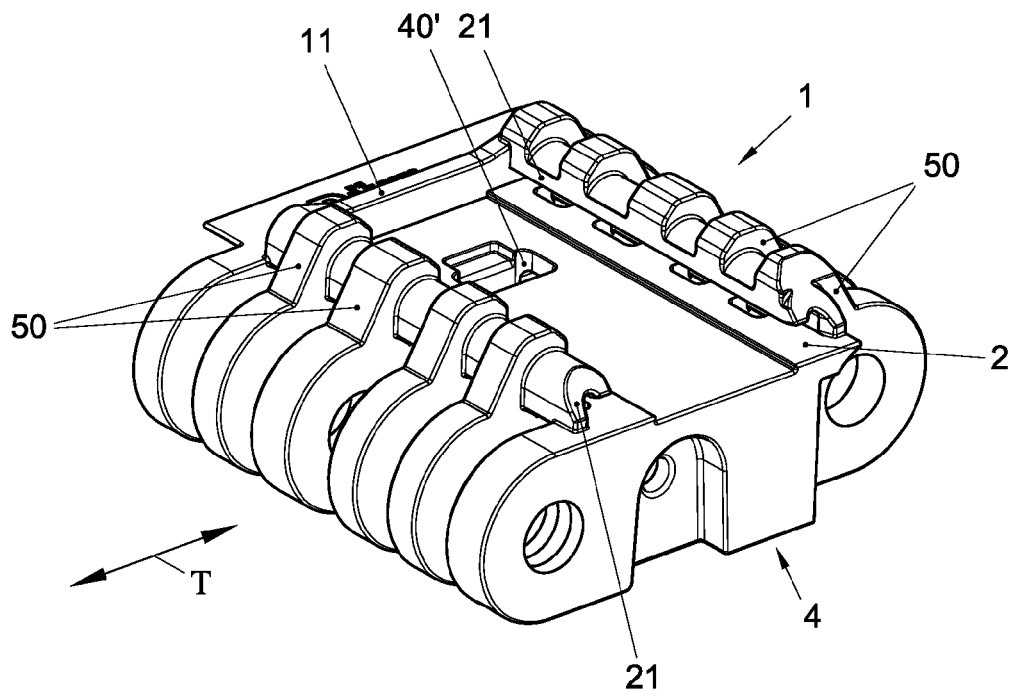
FIG. 4A shows a perspective view of a module according to a fourth embodiment of the invention with the stop elements comprising reinforcing ribs.
Figure 4B:
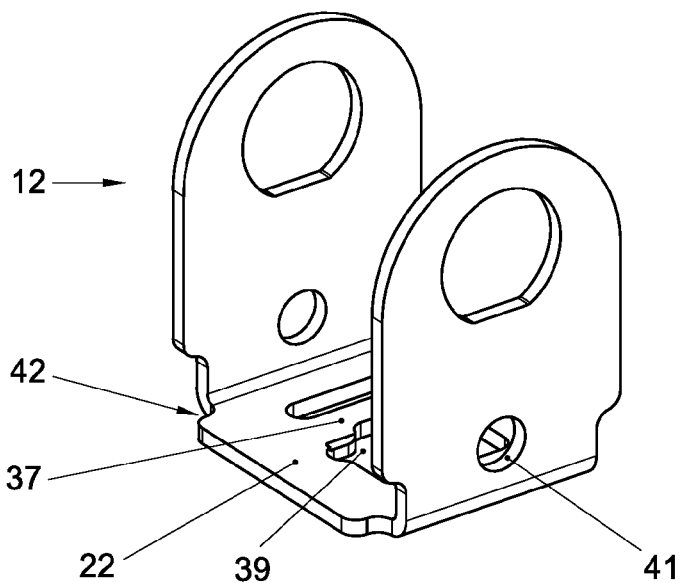
FIG. 4B shows a perspective view of a mounting frame according to the fourth embodiment of the invention.
Figure 4C:
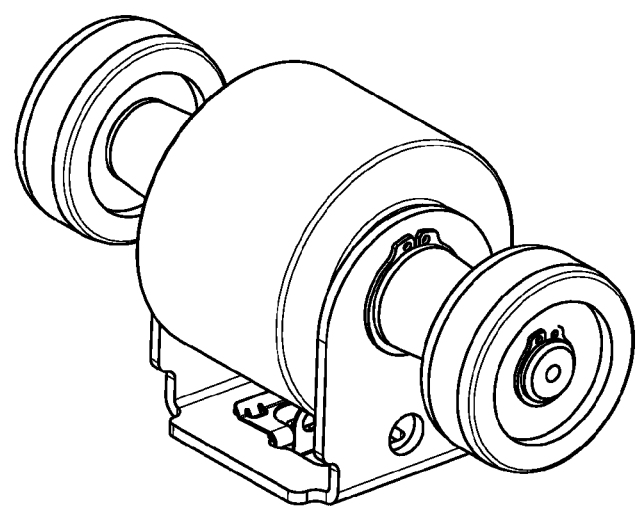
FIG. 4C shows a perspective view of a mounting frame according to FIG. 4B provided with clip according to FIG. 3C for locking the mounting frame and rollers.
Figure 4D:
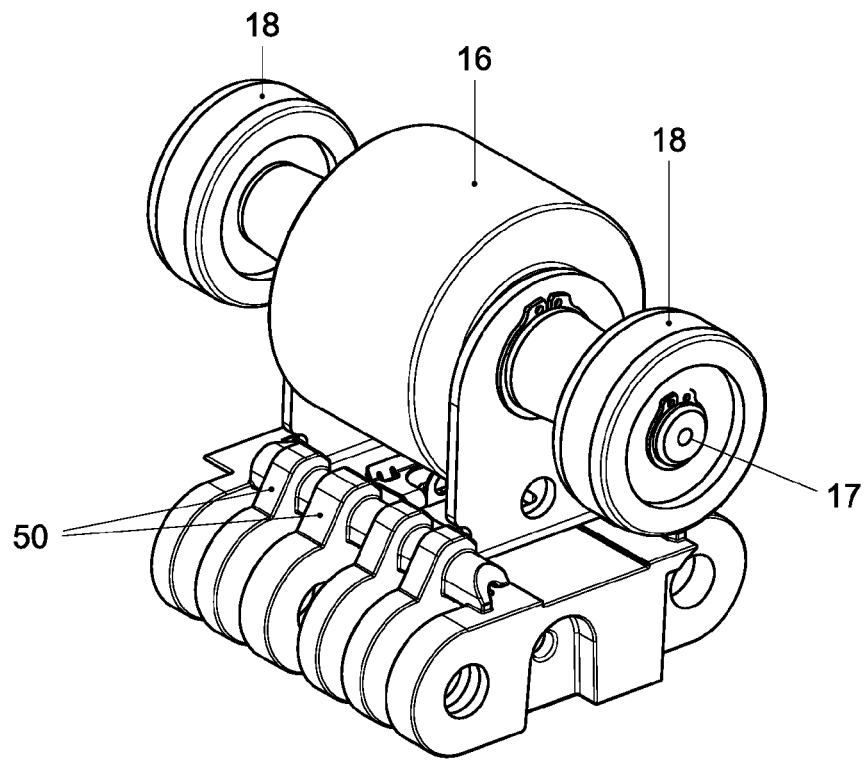
FIG. 4D shows a perspective view of an assembly according to the fourth embodiment of the invention in coupled condition.

In FIGS. 4A-4D, a fourth embodiment according to the invention is shown. As in the embodiment of FIG. 3, in this embodiment, flanges 21 are provided on the stop elements 11 along the legs of the U-shape of the stop elements 11, which flanges 21 are of a continuous design in this embodiment. According to this embodiment, however, the stop elements 11 are provided with reinforcing ribs 50, so that in use, the stop elements can absorb and transmit high peak torsional and shear forces to the module 1 without the stop elements 11 or flanges 21 breaking off or coming loose. Just as in the embodiment of FIG. 3, the legs of the U-shape and the open end of the U-shape, respectively, are directed substantially transversely to the conveying direction T. FIG. 4B shows that the mounting frame 12 is provided with wings 22, which are configured to engage under the flanges 21 upon placement of the mounting frame 12 on the module 1. The wings 22 of the mounting frame are formed by a recess 42 in the mounting frame. This recess 42 ensures not only that, upon placement of the mounting frame 12 on the module 1, the wings 22 can engage under the flanges 21 of the stop element 11, but also that the remaining portion of the mounting frame 12 upon placement on the module 1 can easily pass over the U-shaped stop element 11.

Again, the flanges 21 serve as lock against upward coming loose and/or tilting of the mounting frame 12 from the module 1. Preferably, the wings 22 of the mounting frame 12 are in one plane with the underside of the mounting frame 12, which cooperates with the top surface 3 of the module.

Optionally, the module 1 can be provided with a lock such as a clip 38, which, in this fourth embodiment, can be identical to the clip 38 as shown in FIG. 3C. The clip 38 can have a U-shape die-cut from a sheet steel, which can be received in a recess 39 in the mounting frame 12 and be clipped on the mounting frame 12. The recess in the fourth embodiment of the mounting frame 12 as shown in FIG. 4B is bound on one side by a bridge 37, which provides more rigidity to the mounting frame 12. Together with the mounting frame 12, the clip 38 is slid from the side onto the module 1. Here too, the sliding direction is directed substantially transversely to the conveying direction T of the conveyor in which the module 1 is located. As a result, it can be provided that a mounting frame 12 can be removed from/placed on the module 1 in an easily accessible manner without other mounting frames 12 of adjacent modules 1 of a conveyor being in the way.

A conveyor can for instance be assembled from the above mentioned modules 1 or variants and/or other combinations of above mentioned features for a quick coupling 10, but can also comprise a mix of modules 1 with quick couplings 10 and other modules IL in particular similar modules 1 without quick coupling 10. The conveyor can then be configured as a chain, with the conveyor transversely to the conveying direction T being only one module 1 wide. The conveyor can also be configured as a conveyor mat, with several modules 1 located side by side transversely to the conveying direction T.

A particularly advantageous conveyor comprises several assemblies of modules and mounting frames according to the invention. Here, the distance between at least two adjacent ones of the assemblies is different from the distance between other adjacent assemblies. It appears that as a result of the assemblies being placed at different intervals from each other, the natural vibrations of the conveyor during use can be considerably reduced.

The mounting frame 12 should only be understood as a means for coupling a whole range of different attributes to the module 1 with a quick coupling 10 according to the foregoing. In the embodiments shown, the mounting frame 12 comprises an axle 17 which bears a roller 16 and guiding rollers 18 at the terminal ends of the axle 17, which serve for guidance in for instance, a channel or track. In particular with this embodiment, placing the assemblies on the conveyor at mutually unequal distances from each other is advantageous because of reduction of the natural vibrations. However, the invention is not limited to mounting frames on which rollers are placed, but in lieu thereof carriers may be provided, or supports may be provided on the mounting frame, for instance, for supporting a chassis or frame for a production line. In other embodiments, an attribute may be integrally provided with all features to allow it to be coupled with a quick coupling 10 according to the invention.

The invention claimed is:

1. An assembly for a modular conveyor, said assembly comprising:
    a module including a body part extending transversely to a direction (T), said body part having a substantially closed, flat top surface and a bottom, wherein the body part at a front and rear viewed in the direction (T) includes coupling elements, the coupling elements being couplable to coupling elements of similar modules successive in the direction (T);
    a mounting frame coupled to the module, wherein coupling of the mounting frame to the module is in an insertion direction (V) which is directed substantially transversely to the direction (T); and
    at least one lock fixed to said body part and engaging said mounting frame, said at least one lock resisting movement of said mounting frame in a direction transverse to the direction (T) and locking the mounting frame against uncoupling from the module.

2. An assembly according to claim 1, including a receiving provision coupling the mounting frame to the module, the receiving provision including one or more stop elements projecting relative to the top surface, wherein each stop element includes a flange, and the mounting frame includes one or more wings, wherein each wing engages a respective flange upon placement of the mounting frame on the receiving provision.

3. An assembly according to claim 1, in which the wings of the mounting frame are in one plane with an underside of the mounting frame.

4. An assembly according to claim 1, including at least one projection on the top surface of the module forming part of said at least one lock, wherein the mounting frame includes at least one recess and wherein the at least one projection coincides with a respective recess of the mounting frame upon placement of the mounting frame.

5. An assembly according to claim 4, in which the at least one projection is flexible and/or resilient.

6. An assembly according to claim 4, in which the at least one projection has a run-on surface.

7. An assembly according to claim 1, including a locking clip forming part of said at least one lock, wherein the mounting frame includes a recess and wherein the locking clip is receivable in and can be clipped into said recess of the mounting frame.

8. An assembly according to claim 7, in which the clip includes a lip which can be spring-biased.

9. An assembly according to claim 8, in which the top surface of the module includes an opening receiving the lip.

10. An assembly according to claim 2, in which at least one of the one or more stop elements is a U-shaped and wherein the one or more flanges are provided along the legs of the U-shape.

11. An assembly for a modular conveyor, said assembly comprising:
    a module including a body part extending transversely to a direction (T) and having a substantially closed, flat top surface and a bottom, wherein the body part at a front and rear viewed in the direction (T) includes coupling elements, the coupling elements being couplable to coupling elements of similar modules successive in the direction (T);
    a mounting frame coupled to the module by a quick coupling, wherein coupling of the mounting frame to the module and uncoupling of the mounting frame from the module is in an insertion direction (V) which is directed substantially transversely to the direction (T);
    a receiving provision coupling the mounting frame to the module, the receiving provision including one or more stop elements projecting relative to the top surface, wherein each stop element includes a flange, and the mounting frame includes one or more wings, wherein each wing engages a respective flange upon placement of the mounting frame on the receiving provision, wherein at least one of the one or more stop elements includes a round top piece provided centrally on the top surface of the module and provided all around, at an intermediate distance from the top surface, with the respective flange provided with at least one recess, and wherein the mounting frame includes a hole with at least one wing which fits, upon placement of the mounting frame over the top piece, through a respective recess and, by turning of the mounting frame, engages under a respective flange.

12. An assembly according to claim 1, in which the module includes claws, while the mounting frame includes slots receiving the claws.

13. An assembly according to claim 2, in which at least one of the one or more stop elements is provided with reinforcing ribs.

14. An assembly according to claim 1, including an axle mounted on the mounting frame, wherein the axle includes at least one roller.

15. A module for use in an assembly according to claim 1, said module comprising:
    a body part having a substantially closed, flat top surface and a bottom, wherein the body part at a front and rear viewed in a direction (T) includes coupling elements, the coupling elements being couplable to coupling elements of similar modules successive in the direction (T).

16. A mounting frame configured for use in an assembly according to claim 1.

17. A conveyor comprising at least one assembly according to claim 1, wherein the direction (T) is the conveying direction of the conveyor.

18. A conveyor according to claim 17, in which all modules of the conveyor are substantially identical.

19. A conveyor according to claim 17, in which the at least one assembly is several assemblies, wherein the distance between at least two adjacent ones of the assemblies is different from the distance between other adjacent assemblies.

* * * * *

UNITED STATES PATENT AND TRADEMARK OFFICE
CERTIFICATE OF CORRECTION

| | | Page 1 of 1 |
|---|---|---|
| PATENT NO. | : 9,199,797 B2 | |
| APPLICATION NO. | : 14/382989 | |
| DATED | : December 1, 2015 | |
| INVENTOR(S) | : Menke et al. | |

It is certified that error appears in the above-identified patent and that said Letters Patent is hereby corrected as shown below:

In the specification

Column 4, Line 37 - "fame" should be --frame--

Column 8, Line 49 - "IL" should be --1--

Signed and Sealed this
Nineteenth Day of April, 2016

Michelle K. Lee
*Director of the United States Patent and Trademark Office*